Nov. 14, 1939.  L. M. PIGNOLET  2,179,952
ELECTRICAL MEASURING INSTRUMENT
Filed June 3, 1936  2 Sheets-Sheet 1

INVENTOR.
Louis M. Pignolet
BY M. Theodore Simmons
ATTORNEY.

Patented Nov. 14, 1939

2,179,952

UNITED STATES PATENT OFFICE 2,179,952

ELECTRICAL MEASURING INSTRUMENT

Louis M. Pignolet, Chatham, N. J.

Application June 3, 1936, Serial No. 83,208

9 Claims. (Cl. 171—95)

My invention relates to electrical instruments, and particularly to measuring instruments of the inclined-vane voltmeter and ammeter type providing uniform long-scale readings.

In an inclined-vane meter, in which the armature or vane is disposed at an angle to the meter shaft or spindle, on which it is mounted, and also to the electromagnetic field in which it operates, the vane is usually disposed in the aperture through the coil, thereby requiring the coil to be of a certain relatively large size and, among other things, the instrument as a whole to be correspondingly larger and more expensive to manufacture than other instruments, such as one having a magnetizable core and the vane outside the coil.

Instruments of the inclined-vane type with the advantages thereof included therein, are exemplified by Patent No. 542,663, issued July 16, 1895, to Elihu Thomson, and Patent No. 671,279, issued April 2, 1901, to Charles S. Jameson.

The inclined-vane instrument permits the use of a scale of substantially greater extent than other instruments or, in other words, permits a greater indicator deflection per unit of energizing or actuating strength, or a correspondingly greater spacing of the scale markings, so that, for accurate readings, an instrument of the inclined-vane type is substantially more effective.

It is among the objects of my invention to utilize the advantages, and to avoid the disadvantages, of an instrument of the inclined-vane type in obtaining a scale of relatively great extent and uniformity, and to so combine the structure of the above-mentioned smaller instruments, including features original thereto, in novel arrangement, as to substantially reduce the size of the inclined-vane instrument, while rendering the resultant smaller instrument of material advance over instruments of like size heretofore constructed.

A smaller instrument includes a coil and an iron core for cooperation with an armature, and for mounting on a base, the assembly heretofore presenting certain features of relatively difficult and expensive construction, such as the character and construction of the core, and of its attachment to the base. Where a solid core is employed, it is of relatively rigid character resistant to bending or working, requires special tools or attachments for effecting its mounting, and also is conducive to the formation of eddy currents or hysteresis, resulting in heating, loss of energy and ineffective readings.

It accordingly is another object of my invention to overcome these objections and to provide an instrument in which the core and the coil, and other parts, are of simple construction and easy to mount, the core is subject to ready bending or shaping, the losses are reduced, and the assembly of the elements is greatly facilitated.

Among the other objects of the invention, resulting from, or independent of, the above-mentioned features, are to render the instrument more compact, simple and durable in construction, economical to manufacture, and effective in its operation.

Further objects include the provision of a novel magnetizable shunt or calibration feature whereby, after the kind of assembly permissible in quantity production, the instruments may nevertheless be rendered highly accurate or precise in a simple, convenient and effective manner without adding materially to the ultimate cost; to adapt the instrument to direct-current applications by the use of a novel vane-control magnet and a polarized vane structure; to provide for a selection of positions of the coil and core assembly on a universal base; and to provide a core structure including both magnetizable and non-magnetizable elements whereby the latter, or its equivalent whether forming part of the core or not will constitute means for quickly, effectively and permanently securing the coil and the core in place, and permit their ready dismounting from the base.

With such objects in view, as well as other advantages which may be incident to a utilization of the improvements, the invention comprises the parts and combinations thereof hereinafter set forth and claimed, with the understanding that the several necessary elements constituting the same may be varied in proportion, arrangement and combination without departing from the nature and scope of the invention.

In order to make the invention more clearly understood, means are shown in the accompanying drawing and described in the following specification, for carrying the invention into practical effect, without limiting the improvements in their useful applications to the particular constructions, which are shown for the purpose of illustration of the invention.

Figure 1, of the accompanying drawings, is a top-plan view, with casing removed, of the remaining portion of an alternating-current instrument embodying the invention;

Figure 1:
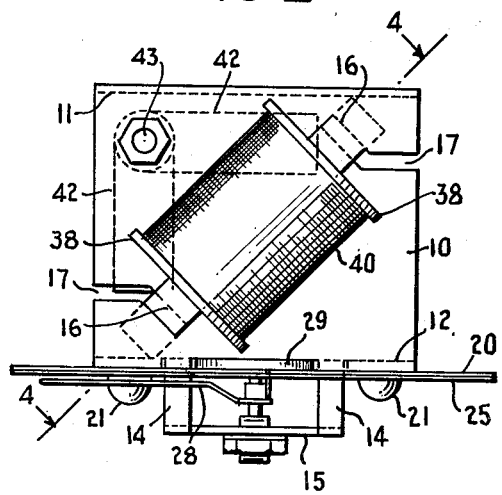
Figure 2:
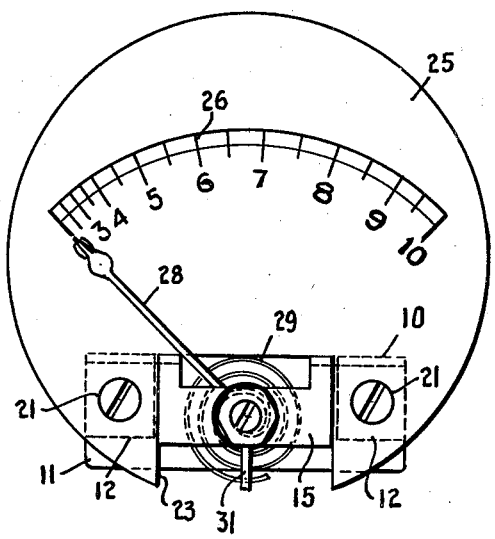
Figure 2 is a view, in front elevation, of the structure of Figure 1.

Referring to Figures 1 to 4, inclusive, the instrument therein shown comprises a non-magnetic base plate, of brass or other material, including a flat-plane, substantially rectangular table portion 10, preferably for disposition in horizontal position, a depending rear-edge flange 11, and depending forward lugs or flange portions 12 having therebetween a forward extension of open framework character having side arms 14, extending in the plane of the table 10, with a depending cross member or apron 15 at a substantially right angle to the table. The table 10 is provided with rectangular slots 16 arranged near diagonally opposed corners of the table, saw cuts 17 being provided from the adjacent edges of the table into the slots 16 to prevent the circulation of eddy currents.

A scale-backing plate 20, preferably perpendicular to the table portion 10 and constructed of non-magnetic material such as brass, is secured by screws 21 to the lugs 12, with the rear side of the plate 20 against the front sides of the lugs; the plate having a cut-out 23 by which it is fitted about the top horizontal side and the upright sides of the framework extension embodying the arms 14 and the apron 15. A scale plate proper 25, as of paper, also having a cut-out and otherwise conforming substantially to the backing plate 20, is secured to the front side of the backing plate, as by paste, or other suitable means, and is provided with the appropriate front-face scale markings 26.

A shaft or pintle 27, journaled in the rear flange 11 and the front apron 15 for turning movement about its longitudinal axis, carries intermediate its length a magnetizable inclined-vane armature element 30 and at one end a pointer 28, preferably of aluminum. A spiral spring 29, surrounding the shaft 27, has its inner end held against the shaft 27 for biasing the pointer 28 counter-clockwise toward the predetermined zero or neutral position, illustrated in Figure 2, and its outer end held by an extension or bracket element 31 mounted on the apron 15.

Figure 4:
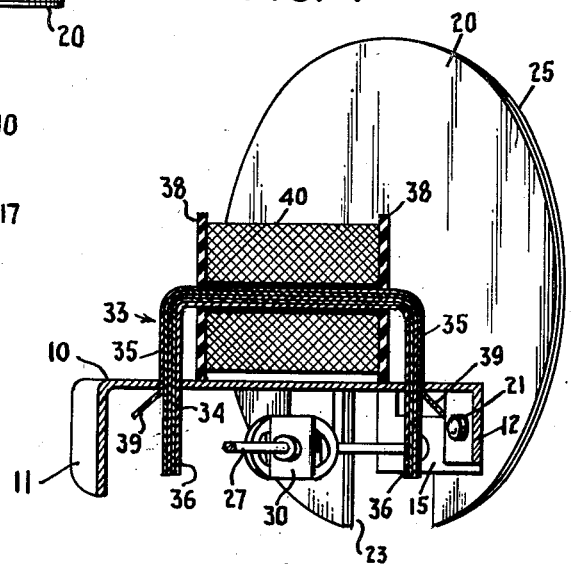
Figure 4 is a detail sectional view, on an enlarged scale, taken substantially along the line 4—4 of Figure 1.

A core structure 33 of inverted substantially U-shape, see particularly Figure 4, comprises magnetizable laminations 34 of soft pliable iron, and a non-magnetizable lamination 35, of copper. The end legs of the core structure 33 are preferably press fitted through the slots 16 in the table 10, extending to a position below the table to form a gap between the legs or pole portions 36, in which gap the vane 30 is located for cooperation with the pole portions.

The non-magnetizable lamination 35 has its end 39 bent outwardly into holding relation to the table at the underside thereof. The spool 38 surrounds the core structure 33 in closely fitting relation thereto, the insulating end plates thereof serving to space the core 33 relative to the table 10. A coil 40 surrounds the spool 38 between the end plates.

Figure 3:
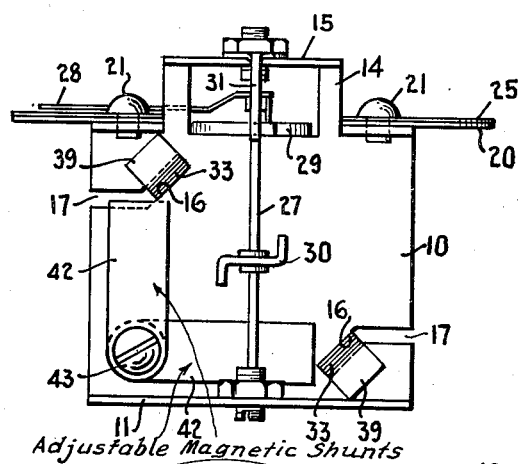
Figure 3 is a bottom-plan view of the instrument of Figures 1 and 2.

As better seen in Figure 3, magnetizable shunt strips 42 are secured, as by a screw 43, to the underside of the table 10 in such a position as to permit adjustment of the strips relative to each other and to the poles 36, moving about the screw 43 as a pivot, whereby fine adjustments of the flux affecting the armature or vane 30 may be effected easily and the parts promptly secured in the adjusted position.

The vane 30 is so inclined, or has ends so inclined, to the shaft 27 and the flux across the gap between the pole pieces 36 as to render the scale 26 unusually long. A desirable construction is to have the central portion of the vane at a right angle to the shaft, and the ends of the vane oppositely bent to provide the effect of an inclined vane. Small washers may then be press-fitted along the shaft to positions at opposite sides of the vane to hold the latter rigidly to the shaft. The term inclined vane is therefore intended to mean a vane of either of the above described forms, or their equivalent.

The core, being laminated and of soft material, may be readily bent to shape, and placed in position by hand, or with simple tools. Having some resiliency, a slight reaction to the bend between the center and ends of the core serves to firmly position the core in the slots 16, while the copper lamination 35, with its bent ends 39, renders it very easy to install or withdraw the coil and the core.

Although the pointer 28 is preferably carried by the movable means including the shaft 27 and the vane 30, and the scale plate 25 is preferably carried by the stationary means including the base plate, this relation may be reversed so that the pointer is stationary and the scale plate movable.

The means movable relative to each other, including the shaft, the pointer and the vane on the one hand, and the base, the coil and the core on the other hand, are so relatively moved in accordance with the flux strength induced by current through the coil, as to move the pointer across the scale over a wide range for a given current value, in fact over a much wider range than has heretofore been feasible with instruments of this type.

The vane 30 being outside the coil 40 permits the latter to be of very much reduced size and cost compared to inclined-vane instruments, as in the above-mentioned patents.

Figure 5:
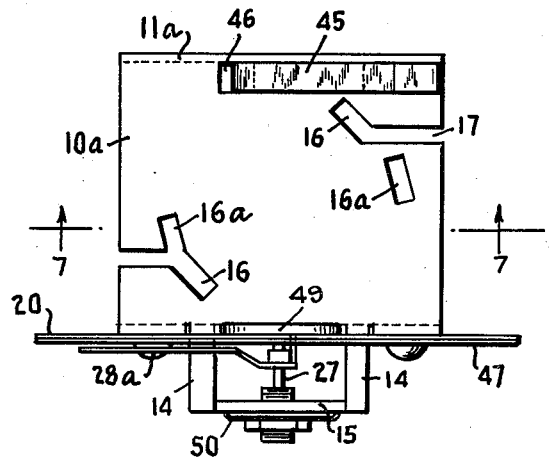
Figure 5 is a view, similar to Figure 1, of a direct-current instrument, constituting a modification of the device of Figure 1, the core and coil and parts of the structure of Figure 1, also applicable to the structure of Figure 5, being omitted.
Figure 6:
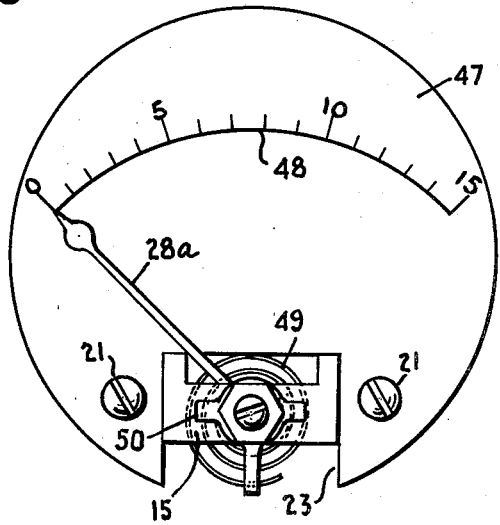
Figure 6 is a view, similar to Figure 2, of the instrument of Figure 5.
Figure 7:
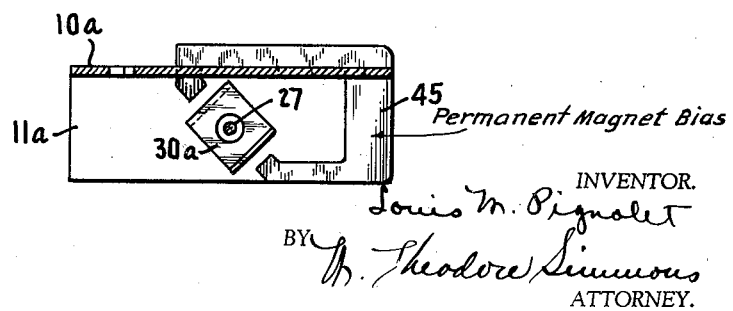
Figure 7 is a detail sectional view taken substantially along the line 7—7 of Figure 5.

In the invention, in its form of Figures 5, 6 and 7, in which corresponding parts are designated by corresponding reference characters, the structure of the core and coil are omitted from these figures as they may be substantially or exactly the same as above set forth, except that this being a direct current meter the size of the wire used on the coil will be different from the size of the wire on the coil of the alternating current meter. Also, the shaft 27, vane 30a, the scale-backing plate proper and other parts may be like those of Figures 1 to 4, inclusive, and need no further description.

However, the table 10a has a pair of receiving or slotted portions 16a, offset from the slots 16, by which the core structure of the energizing coil may be mounted, the legs thereof again forming the pole pieces. The core may be mounted and secured in place in the same manner as described in connection with Figure 4, or in any other convenient manner. For simplicity the one base plate may be used for both A. C. and D. C. meters, in which event the plate will carry all the slots needed for the respective mountings.

Figure 8:
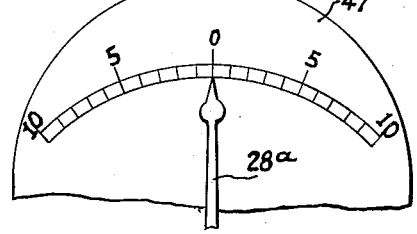
Figure 8 is a front view of a dial for use with certain direct current meters.

The vane 30a is polarized by a permanent magnet 45 shown as mounted in a slot 46 in the rear of the table 10a and secured to the wall 11a. As is well understood in this art, by thus influencing the vane, the instrument may be adapted as a directional direct-current instrument, responding oppositely to currents in opposite directions, such a dial being shown in Fig. 8. Or the vane may be biased to one end of the scale, in which event the polarity of the current will not be indicated. The dial 47 carrying the scale 48, in position to cooperate with the movable pointer 28a that is mounted on the shaft of the vane 30a, illustrates the extent of the scale reading, as well as the equal spacing of the calibrations over the whole scale, obtainable with my improved structure used on direct current applications.

In direct current meters it frequently happens, as for example after the meter has been in service for a while, that the pointer is not always returned to the zero position. For this purpose I provide a small, light spring 49, having one end fastened to the shaft 27 and the other end attached to a movable bracket 50. The spring normally tends to assist the action of the magnet in returning the spring to zero. In the event that the pointer does not register on the zero mark, the bracket 50 is moved to increase or decrease the tension of the spring to set or reset the pointer to its zero position.

The various features described above cooperate toward the simple, easy and economical manufacture and assembly of an instrument having a better combination of length and uniformity of scale in proportion to its size than any instrument of which I am aware, and although I have shown and described particular forms of the invention, changes may be effected therein without departing from the spirit and scope thereof, as set forth in the appended claims.

I claim as my invention:

1. An electrical instrument comprising relatively movable parts, one of which includes a magnetizable core having an air gap and an energizing coil for inducing flux through the gap in the core, and the other of which includes a vane type armature inclined to the direction of the flux in the gap and located substantially wholly within the gap.

2. An electrical instrument comprising means movable relative to each other, one of which includes a coil providing a flux path, and another of which includes an armature inclined to the plane of the flux path and at a position outside the coil for effecting said movement in accordance with the flux strength, and means adjustably mounted on the base and projecting in the flux path for adjusting the flux distribution relative to the armature.

3. An electrical instrument comprising means movable relative to each other, one of which includes a coil providing a flux path, and another of which includes a vane-type armature inclined to the plane of the flux path and situated substantially wholly within the path and at a position outside the coil for effecting said movement in accordance with the flux strength, and a magnet for biasing the armature toward a predetermined position.

4. An electrical instrument comprising a base having a pair of slots therein, an armature movably mounted on the base at one side thereof, means for actuating the armature including a coil and a magnetizable core of substantially U-shape disposed generally at the opposite side of the base with a mid-section in the coil, the core also having legs extending in said slots in cooperative relation to the armature, and a non-magnetic element also generally U-shape conforming to the core having a mid-section in the coil, portions extending through the slots and ends bent into holding relation to the base at said opposite side for holding the core and the coil to the base.

5. An electrical instrument comprising a base having a plurality of pairs of slots therein, an armature movably mounted on the base at one side thereof, means for actuating the armature including a coil and a magnetizable core of substantially U-shape disposed generally at one side of the base with a mid-section in the coil, the core also having legs selectively disposed in the slots of one of said plurality of pairs in cooperative relation to the armature, and a non-magnetizable element also generally of U-shape having a mid-section in the coil, portions extending through the slots and ends bent into holding relation to the base at the opposite side for holding the core and the coil to the base.

6. In an electrical instrument, cooperating elements movable relative to each other, a shaft turnable about its longitudinal axis by which one of said elements is carried to effect said relative movement, and means for turning the shaft comprising a magnetizable vane-type armature carried by the shaft at a right angle thereto and having offset portions adjacent each end, a coil disposed aside the shaft, and core means for the coil including pole portions disposed in cooperative relation to the inclined armature for deflecting the same in accordance with energization of the coil and the effective inclination of the armature.

7. In an electrical instrument, cooperating elements movable relative to each other, a base on which one of said elements is supported, a shaft turnable about its longitudinal axis by which another of said elements is carried to effect said relative movement, and means for turning the shaft comprising an armature carried by the shaft, a coil mounted on said base, and laminated core means for the coil including magnetizable pole portions disposed in cooperative relation to the armature for deflecting the same in accordance with energization of the coil and a non-magnetizable lamination for attaching the coil to the base.

8. In an electrical measuring instrument, a scale plate, a non-magnetic base plate including a slotted flat-plane table portion disposed substantially perpendicularly to the scale plate at the rear thereof and having shaft-journal portions at an angle to the table portion, a shaft supported in said journal portions disposed and projecting to a position at the front side of the scale plate, a pointer secured to the shaft at said position, an armature secured to the shaft between said journal portions, a core structure at one side of the table portion including a magnetizable element of substantially U-shape having pole end portions fitted into slots of the table portion in cooperative relation to the armature and a non-magnetizable element having angularly-bent end portions at the opposite side of the table portion in holding relation thereto to hold the core structure to the table portion, and a coil surrounding portions of said magnetic and non-magnetic core-structure elements, and a second magnetizable element mounted on the base plate having pole end portions for cooperation with the pole portions of the armature.

9. In an electrical measuring instrument, a scale plate, a non-magnetic base plate including a slotted flat-plane table portion disposed at substantially a right angle to the scale plate at the rear side thereof, and having opposite edge flange means at an angle to the table portion to the outer side of which flange means at one edge the scale plate is secured near the end of a diameter of the scale plate, a shaft journaled on said base plate and projecting through the scale plate, a pointer carried by the shaft at the front side of the scale plate, an armature secured to the shaft between said opposite edges, a laminated core structure at one side of the table portion including magnetizable laminations of substantially U-shape having pole-end portions slip-fitted into slots of the table portion in cooperative relation to the armature and a non-magnetizable lamination conforming generally to the magnetizable laminations but having angularly bent end portions at the opposite side of the table portion holding the core structure in position, a coil for the core structure surrounding portions of said magnetic and non-magnetic core-structure laminations, and a magnetizable element mounted on the base plate and having pole portions for cooperation with the pole portions of the armature.

LOUIS M. PIGNOLET.

CERTIFICATE OF CORRECTION.

Patent No. 2,179,952.                                                November 14, 1939.

LOUIS M. PIGNOLET.

It is hereby certified that error appears in the printed specification of the above numbered patent requiring correction as follows: Page 3, second column, line 64, claim 8, strike out the word "disposed" and insert the same before "at" in line 63, same claim; and that the said Letters Patent should be read with this correction therein that the same may conform to the record of the case in the Patent Office.

Signed and sealed this 16th day of January, A. D. 1940.

Henry Van Arsdale,
                                                     Acting Commissioner of Patents.
(Seal)